(12) United States Patent
Lin et al.

(10) Patent No.: US 11,544,598 B1
(45) Date of Patent: Jan. 3, 2023

(54) SYSTEMS AND METHODS FOR DYNAMIC ADJUSTMENT OF COMPUTER MODELS

(71) Applicant: MASSACHUSETTS MUTUAL LIFE INSURANCE COMPANY, Springfield, MA (US)

(72) Inventors: Xiaomin Lin, Springfield, MA (US); Matthew Girard, Springfield, MA (US); Michael Crough, Springfield, MA (US); Peng Wang, Springfield, MA (US); Adam Fox, Springfield, MA (US); Robert Greif, Springfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 375 days.

(21) Appl. No.: 16/906,423

(22) Filed: Jun. 19, 2020

Related U.S. Application Data

(60) Provisional application No. 62/863,730, filed on Jun. 19, 2019.

(51) Int. Cl.
*G06F 15/16* (2006.01)
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
USPC ....................................................... 709/200
See application file for complete search history.

(56) References Cited

U.S. PATENT DOCUMENTS

| | | | | |
|---|---|---|---|---|
| 9,390,456 | B2* | 7/2016 | Eldawy ................ | G06F 16/958 |
| 10,460,247 | B2* | 10/2019 | Swaminathan ........ | G06Q 30/02 |
| 11,080,336 | B2* | 8/2021 | Van Dusen .......... | G06Q 50/184 |
| 2014/0181637 | A1* | 6/2014 | Eldawy ................ | G06Q 50/01 |
| | | | | 715/234 |
| 2019/0138372 | A1* | 5/2019 | Tee ........................ | G06Q 10/20 |
| 2019/0139448 | A1* | 5/2019 | Marshall ................. | G09B 7/02 |
| 2019/0378043 | A1* | 12/2019 | Pippenger ............. | G06N 20/20 |
| 2020/0210533 | A1* | 7/2020 | Markiz ................... | G06F 30/13 |
| 2020/0252802 | A1* | 8/2020 | Pachauri ................ | H04W 8/26 |
| 2020/0356865 | A1* | 11/2020 | D'Auria ................. | G06N 3/08 |
| 2021/0073592 | A1* | 3/2021 | Morgan ............... | G06K 9/6253 |
| 2021/0281469 | A1* | 9/2021 | Tee ..................... | H04L 41/0886 |

* cited by examiner

*Primary Examiner* — Moustafa M Meky
(74) *Attorney, Agent, or Firm* — Foley & Lardner LLP

(57) ABSTRACT

Disclosed herein are embodiments of systems, methods, and products comprises an analytic server, which evaluates user data for premium financing status and dynamically renders graphical user interfaces. The server trains an artificial intelligence model based on historical user data. The artificial intelligence model comprises one or more data points with each data point representing one of a plurality of attributes and applies a logistic regression algorithm to identify a weight factor for each attribute. The server uses a dynamic algorithm to generate a score by combining the plurality of attributes based on the weight factors. The server receives responses regarding the scores that indicate the premium financing status of each case. The server retrains the artificial intelligence model to identify new weight factors based on negative responses data. The server automatically displays new scores calculated based on the new weight factors.

20 Claims, 11 Drawing Sheets

SYSTEMS AND METHODS FOR DYNAMIC ADJUSTMENT OF COMPUTER MODELS

CROSS REFERENCE TO RELATED APPLICATIONS

This application claims priority to U.S. Provisional Application No. 62/863,730, filed Jun. 19, 2019, which is incorporated by reference in its entirety for all purposes.

TECHNICAL FIELD

This application relates generally to methods and systems for dynamic adjustment of algorithms embedded in computer models using artificial intelligence.

BACKGROUND

Conventional data intake software solutions (e.g., spreadsheets) may provide an interactive cellular interface for data intake, display, and processing. These software solutions receive data and execute predetermined algorithms to identify results (e.g., scores calculated based on the inputted data). For instance, an end user may initiate a spreadsheet to input data where the spreadsheet executes predetermined algorithms to calculate a score based on the inputted data. These software solutions can be locally run or executed via a network-based protocol. As the processing power of computers allow for greater computer functionality and the Internet technology era allows for interconnectivity between computing systems, many institutions rely on these software solutions to process data. For instance, agents may utilize computing devices (e.g., tablets) equipped with spreadsheets where agents can manually enter customer data/attributes and receive a score.

However, these software solutions have faced several technical shortcomings. First, conventional software solutions use a static algorithm to calculate results. Using static algorithms is not efficient and may produce outdated results. Second, conventional software solutions do not provide a user-friendly method of revising algorithms used to calculate the results. For instance, conventional software solutions may require end users to manually revise the underlying algorithm (including various weight factors), which is a time-consuming and tedious process that is error-prone. Moreover, conventional software solutions require end users to be familiar with complex coding to revise the underlying algorithm. This task has been proven difficult because most employees have little or no software programming knowledge.

SUMMARY

For the aforementioned reasons, there is a need for a user-friendly system and method for dynamically generating scores, which is configured to be modified by a person with minimal knowledge of programming. The methods and systems described herein describe generating, training, and executing artificial intelligence models to identify and optimize algorithms to calculate user scores/status using previous historical customer data. The methods and systems described herein also describe that a central server can automatically revise the algorithm used by the spreadsheets locally accessed by users without requiring the users to manually revise the spreadsheet or the underlying software code.

Embodiments disclosed herein address the above-described challenges. Specifically, an analytic server may train an artificial intelligence (AI) model based on historical user data to learn the relationship between user attributes and their status. The analytic server may predict a new customer's status by applying the artificial intelligence model. The analytic server may determine a score for each new customer and display the score on a graphical user interface (GUI) for an administrator to confirm the status. After receiving responses on the status of the new customer, the analytic server may automatically retrain the artificial intelligence model based on the responses and recalculate a new score based on the retrained artificial intelligence model. The analytic server may also render the graphical user interface to display the new score. The analytic server may perform the retraining of the artificial intelligence model and the rendering of the graphical user interface automatically without requiring actions from the administrator, thus improving the user experience.

In an embodiment, a method comprises generating, by a server, an artificial intelligence model comprising a set of data points, each data point representing an attribute within a plurality of attributes of a historical dataset, the server using a dynamic algorithm having a first weight factor to generate a score based on the plurality of attributes, wherein the server applies a logistic regression algorithm to determine the first weight factor; training, by the server, the artificial intelligence model by iteratively executing the artificial intelligence model based on a validation dataset comprising known attributes and their corresponding scores, wherein with each iteration, the artificial intelligence model revises the dynamic algorithm, and wherein the server identifies a second weight factor using the trained artificial intelligence model; causing, by the server, execution of a computer model installed on a computing device based on a new user dataset where the computer model: determines the score for the new user dataset using the dynamic algorithm and the second weight factor, and displays the score for the new user dataset on a graphical user interface of the computing device; transmitting, by the server, a notification to the computing device prompting a confirmation of the score; in response to receiving a positive response from the computing device, automatically updating, by the server, the computer model in accordance with the second weight factor; and in response to receiving a negative response from the computing device, identifying, by the server, a third weight factor by retraining the artificial intelligence model, whereby the server displays a new score calculated based on the third weight factor.

In another embodiment, a system comprises a server comprising a processor and a non-transitory computer-readable medium containing instructions that when executed by the processor causes the processor to perform operations comprising generating, by a server, an artificial intelligence model comprising a set of data points, each data point representing an attribute within a plurality of attributes of a historical dataset, the server using a dynamic algorithm having a first weight factor to generate a score based on the plurality of attributes, wherein the server applies a logistic regression algorithm to determine the first weight factor; training, by the server, the artificial intelligence model by iteratively executing the artificial intelligence model based on a validation dataset comprising known attributes and their corresponding scores, wherein with each iteration, the artificial intelligence model revises the dynamic algorithm, and wherein the server identifies a second weight factor using the trained artificial intelligence model; causing, by the server, execution of a computer model installed on a computing device based on a new user dataset where the computer model determines the score for the new user dataset using the dynamic algorithm and the second weight factor, and displays the score for the new user dataset on a graphical user interface of the computing device; transmitting, by the server, a notification to the computing device prompting a confirmation of the score; in response to receiving a positive response from the computing device, automatically updating, by the server, the computer model in accordance with the second weight factor; and in response to receiving a negative response from the computing device, identifying, by the server, a third weight factor by retraining the artificial intelligence model, whereby the server displays a new score calculated based on the third weight factor.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 7 illustrates a graphical user interface for managing potential premium financing users in the traditional method, according to an embodiment.

FIG. 8 illustrates a graphical user interface for managing potential premium financing users in the method described herein, according to an embodiment.

DETAILED DESCRIPTION

Figure 1:
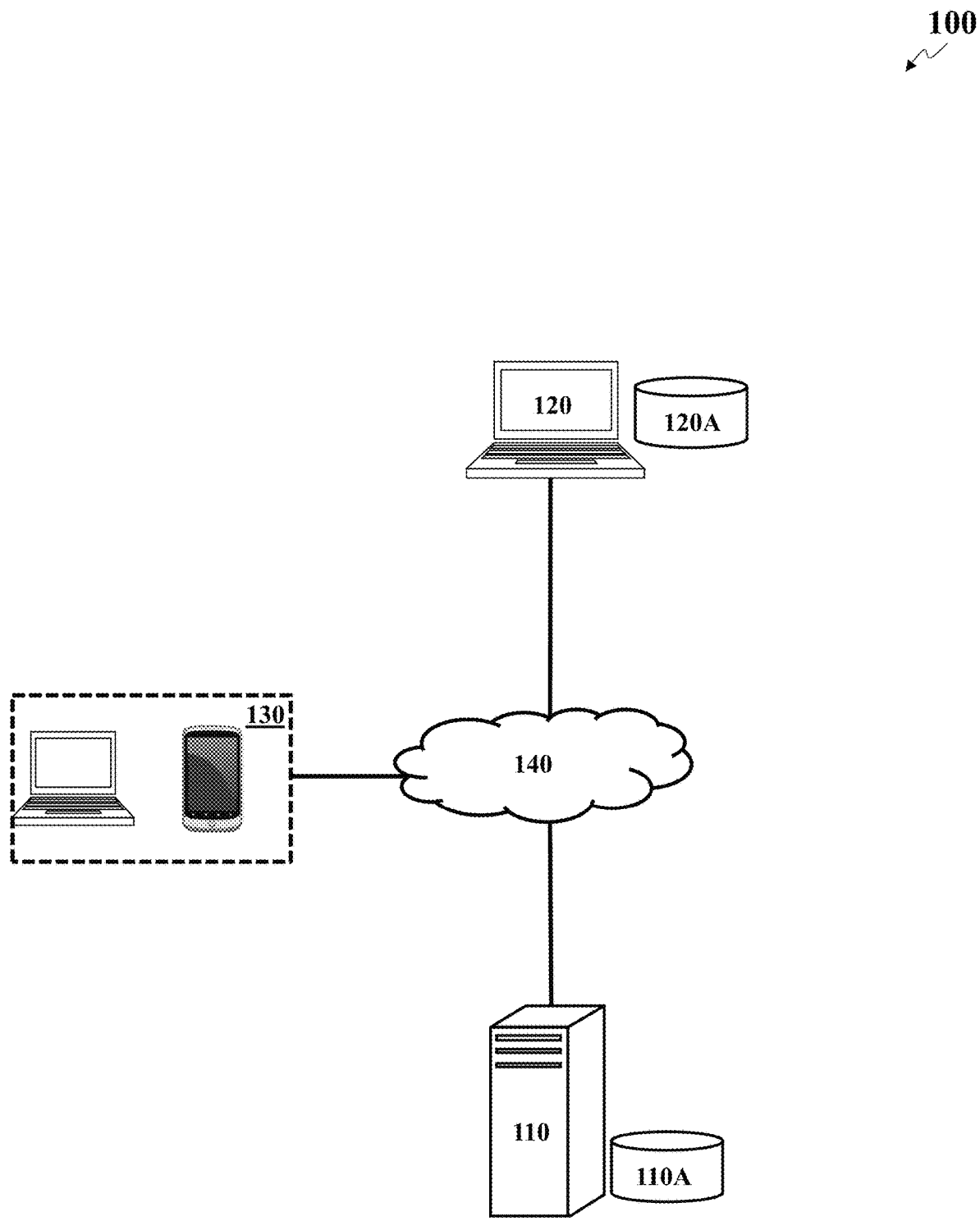
FIG. 1 illustrates a computer system for evaluating data and dynamic adjustment of computer models, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe a system and method for generating an artificial intelligence model based on known results, determining a new customer's status using the artificial intelligence model and dynamically rendering a graphical user interface based on the status. Embodiments disclosed herein also describe dynamically adjusting computer models based on executing an artificial intelligence model. For example, the status may be a premium financing status. Many health-related consumer protection companies provide different payment methods to consumers for health-related products. One of the payment methods may be premium financing, which means that policy owners borrow funds from outside lenders to pay their premium. Premium financing is unfavorable because statistics show that policies with premium financing are more likely to lapse in a short period of time from issuance than those without premium financing. Thus, it is important to identify premium-financing cases (already occurred and potentially may occur, disclosed upfront and undisclosed). In conventional methods, an agent/employee may check the user/customer information in the spreadsheet and manually determine if the user is using premium financing. The employee may then update a field in the spreadsheet to indicate the status of premium financing. This process is burdensome and error prone. Embodiments disclosed herein describe an accurate and efficient computer-implemented system and method for identifying premium-financing cases.

In conventional methods, the agent or administrator may check if a user has collateral assignment, which may be an indicator that the user is using premium financing. For example, the conventional methods may use the collateral assignment as a filter to identify the potential premium financing cases. Within the users having collateral assignments, the agent may further manually determine if a user is indeed using premium financing. Specifically, the conventional methods use the collateral assignment filter to narrow down high volume cases to a manageable volume. The agent then investigates the users included in the manageable volume for premium financing cases. However, this filter in conventional methods may miss users that do not fit the filter, but actually are premium-financing cases. For example, some users without collateral assignment may also be premium-financing cases. Only looking at the attribute of collateral assignment may not be sufficient to include all the potential premium-financing users. Embodiments described herein provide a method that considers a plurality of attributes, assigns a weight factor to each attribute, and determines a score by combining the plurality of attributes based on their weight factors. The score may correspond to the probability of a user being in the premium financing status.

Embodiments disclosed herein describe a system and method for dynamically rendering a graphical user interface indicating a user's status (e.g., premium financing status).

Specifically, an analytic server may train an artificial intelligence model based on historical user data. The artificial intelligence model may comprise one or more data points with each data point representing one of a plurality of user attributes. The artificial intelligence model may apply a logistic regression algorithm to determine a weight factor associated with each attribute. The analytic server may use a dynamic algorithm to determine a score for each customer by combining the plurality of attributes based on the weight factors. The analytic server may predict a new customer's status by applying the artificial intelligence model. The analytic server may determine a score for each new customer and display the score on a graphical user interface for an administrator to confirm the status. After receiving responses on the status of the new customer, the analytic server may automatically retrain the artificial intelligence model based on the responses and recalculate a new score based on the retrained artificial intelligence model. The analytic server may also render the graphical user interface to display the new score. The analytic server may perform the retraining of the artificial intelligence model and the rendering of the graphical user interface automatically without requiring actions from the administrator, thus improving the user experience.

FIG. 1 illustrates components of a system 100 for evaluating data and dynamic adjustment of computer models, according to an embodiment. The system 100 may comprise an analytic server 110, a historical user database 110A, an administrator computing device 120 operated by an agent/employee, a new customer/user database 120A, and a set of electronic user devices that are connected with each other via hardware and software components of one or more networks 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, configured to train an artificial intelligence model for evaluating the customer/user data. The analytic server 110 may be logically and physically organized within the same or different devices or structures, and may be distributed across any number of physical structures and locations (e.g., cabinets, rooms, buildings, cities). The analytic server 110 may retrieve historical data from the historical user database 110A. The historical data may comprise a plurality of attributes associated with each existing user and known result of the status of the premium financing for each existing user. The analytic server 110 may train the artificial intelligence model to determine if a customer is using premium financing based on the plurality of attributes associated with the customer. Specifically, the artificial intelligence model may comprise one or more data points with each data point representing one of a plurality of user attributes. The artificial intelligence model may apply a logistic regression algorithm to determine a weight factor associated with each attribute. The analytic server may use a dynamic algorithm to determine a score for each customer by combining the plurality of attributes based on the weight factors. The score may reflect the probability of the customer being a premium financing case.

In some embodiments, the analytic server 110 may split the historical user data into two groups: a training dataset and a validation dataset. For example, 75% of the historical user data may be the training dataset, the other 25% of the historical user data may be the validation dataset. The analytic server 110 may train the artificial intelligence model based on the training dataset and validate the trained artificial intelligence model based on the validation dataset. In the validation of the artificial intelligence model, the analytic server 110 may iteratively execute the artificial intelligence model based on the validation dataset. Within each iteration, the artificial intelligence model may revise the dynamic algorithm by identifying a new weight factor associated with each attribute so that the scores calculated based on the new weight factor are consistent with the known results of validation dataset.

The historical user database 110A may be any non-transitory machine-readable media configured to store existing customers' data, including user identifier, a plurality of user attributes including age, gender, occupation, income, collateral assignment, purchased products, products prices, payment history, premium financing status, and the like. The historical user database 110A may include any other related data of the existing users that may be used to better analyze and evaluate the user premium financing status.

The analytic server 110 may retrieve the historical user data on existing customers to train the artificial intelligence model. Specifically, the analytic server 110 may learn from the historical data on the existing customers by studying the hidden pattern for a relationship between the attributes and the premium financing status. Based on such a relationship, the analytic server 110 may predict a new customer's premium financing status. Specifically, the analytic server 110 may use the new customer's data (e.g., attributes) as input of the artificial intelligence model and output a score that indicates the probability of the new customer being in a status (e.g., premium financing status). The analytic server 110 may also receive responses that confirm the new customers' premium financing statuses. The analytic server 110 may update the historical user database by adding the new customers' data (e.g., attributes and premium financing statuses). Furthermore, the analytic server 110 may retrain the artificial intelligence model based on the new customers' data.

The set of electronic user devices 130 may be any computing device allowing a user to interact with the analytic server 110. The electronic user devices 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 130 may comprise any number of input and output devices supporting various types of data, such as text, image, audio, video, and the like. A new customer/user operating the electronic user device 130 may apply for a product or policy by inputting user data into an application form displayed on the electronic user device 130. The user data may comprise a plurality of user attributes. The new customers' data may be stored in a new customer database 120A. An administrator operating the administrator computing device 120 may investigate and evaluate the new customer's data (e.g., user attributes) and determine whether a new customer is using premium financing.

The administrator-computing device 120 may be any computing device allowing an administrative user, such as an employee/agent from the health-related consumer protection company, to interact with the analytic server 110. The administrator-computing device 120 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The administrator-computing device 120 may comprise any number of input and output devices supporting various types of data, such as text, image, audio, video, and the like.

The administrator-computing device 120 may run a computer model that manages new customers' data whose premium financing statuses are not determined/confirmed. The computer model may be embedded in an application or a spreadsheet comprising the attributes and the scores for each new customer. An administrator may investigate the cases with high scores and further determine the status of the premium financing for those cases. The spreadsheet or application comprising the computer model may display a graphical user interface with an interactive element that allows the administrator to input the premium financing status for each new customer. The administrator-computing device 120 may comprise, or may be in networked-communication with a new customer database 120A.

The new customer database 120A may be any non-transitory machine-readable media configured to store new customers' data, including user identifier, a plurality of user attributes including age, gender, occupation, income, collateral assignment, purchased products, products prices, payment history, and the like. The status of premium financing for new customers may be unavailable. The administrator-computing device 120 may retrieve the new customers' data from the new customer database 120A, run the computer model to calculate a score for each new customer. The computer model may calculate the score by using the dynamic algorithm based on the new customers' attributes and original weight values (e.g., predetermined or default values).

The analytic server 110 may compare the weight factors generated by the artificial intelligence model with the original weight values. If different, the analytic server 110 may update the computer model by replacing the original weight values with the weight factors generated by the artificial intelligence model. After updating the computer model with the weight factors generated by the artificial intelligence model, the analytic server 110 may execute the computer model to calculate a score for each new customer based on the weight factors generated by the artificial intelligence model. The computer model may automatically update the graphical user interface (GUI) of the spreadsheet to display the score.

The administrator may investigate those with high scores (e.g., scores satisfying a threshold), and determine the status of the premium financing for those cases. The analytic server 110 may receive responses regarding the scores. The responses may indicate the status of the premium financing for the new customers. The analytic server 110 may update the historical user data in the historical user database to include the new customers' data when the premium financing status are available. In addition, some of the responses may be negative responses, which means some cases are not premium financing cases even if they have scores satisfying a threshold. The analytic server 110 may retrieve the new customers' data that have negative responses and retrain the artificial intelligence model based on such new customers' data to identify new weight factors. The analytic server 110 may automatically update the computer model in accordance with the newly retrained weight factors. The analytic server 110 may also update the GUI of the spreadsheet by displaying a new score calculated based on the newly retrained weight factors on the administrator-computing device 120.

In some embodiments, the administrator-computing device 120 may execute the computer model and comprise the new customer database 120A, as discussed above. In some other embodiments, the analytic server 110 may execute the computer model and comprise the new customer database 120A. For example, the analytic server 110 may determine the score for each new customer based on the weight factors generated by the artificial intelligence model, and update the GUI on the administrator-computing device to display the scores.

Figure 2:
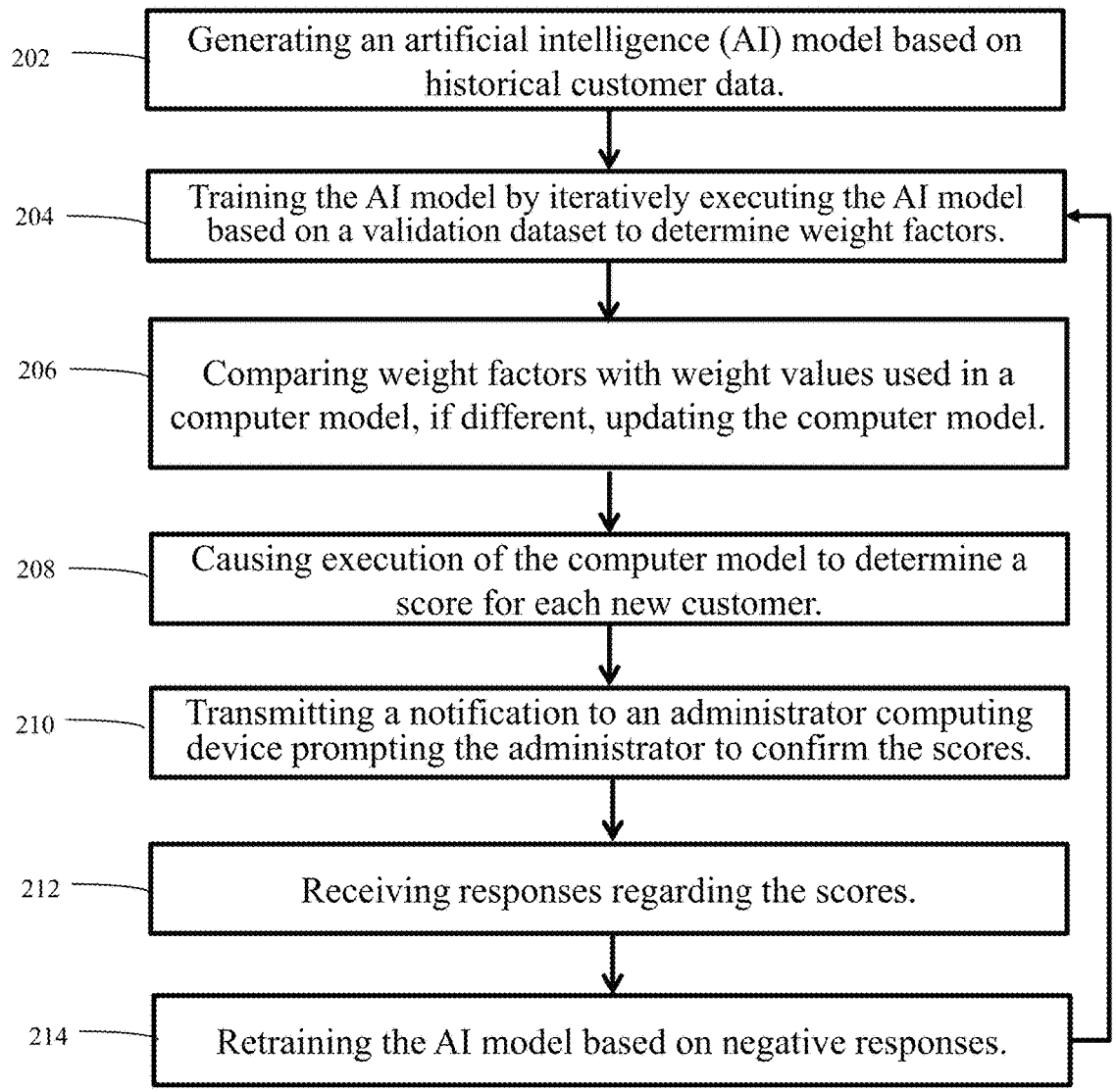
FIG. 2 illustrates a flowchart depicting operational steps for evaluating data and dynamic adjustment of computer models, according to an embodiment.

FIG. 2 illustrates execution of a method 200 for evaluating data and dynamic adjustment of computer models, according to an embodiment. Other embodiments may comprise additional or alternative steps, or may omit some steps altogether.

At step 202, the analytic server may generate an artificial intelligence model based on historical user data. The analytic server may train the artificial intelligence model to predict if a customer is using premium financing based on a plurality of attributes associated with the customer. The plurality of attributes may include income, age, collateral assignment indicating whether there is a collateral assignment, purchased products, products prices, payment history, a predetermined form attachment (e.g., form 7002), face amount of the policy at application, waiver of premium indicator, owner category indicating whether a policy owner is an individual or an institution, tobacco addiction level, time to issue, and the like.

In some embodiments, the artificial intelligence model may comprise one or more data points with each data point representing each of the plurality of attributes. The analytic server may use a dynamic algorithm having a weight factor to generate a score based on the plurality of attributes. The analytic server may apply a logistic regression algorithm to determine the weight factor associated with each attribute. The dynamic algorithm may determine a score for each customer by combining the plurality of attributes based on the weight factors.

In some other embodiments, the artificial intelligence model may comprise a neural network having one or more interrelated nodes with each node representing one of the plurality of attributes. The artificial intelligence model may comprise a dynamic algorithm corresponding to the interrelation of the nodes. The dynamic algorithm may comprise a weight factor associated with each node. The dynamic algorithm may determine a score for each customer by combining the plurality of attributes based on the weight factors.

The dynamic algorithm may be a linear function that combining the plurality of attributes in a linear manner using the weight factors. The score may reflect the probability of the customer being a premium financing case. The analytic server may train the artificial intelligence model based on a dataset of existing customers.

In some embodiments, the analytic server may train the artificial intelligence model based on a subset of the historical user data, which is the training dataset. The analytic server may validate the trained artificial intelligence model based on the rest of the historical user data, which is the validation dataset. For example, the analytic server may train the artificial intelligence model based on 75% of the historical user data and validate the artificial intelligence model based on the 25% of the historical user data. The historical user data may comprise the attributes and known result of the status of premium financing for each existing customer. The analytic server may validate the artificial intelligence model by iteratively executing the artificial intelligence model based on the validation dataset.

The analytic server may train the artificial intelligence model by applying predictive modeling techniques and algorithms, including but are not limited to, neural networks (NNs), support vector machine (SVMs), decision trees, linear and logistic regression, clustering, association rules, and scorecards, to learn the patterns hidden in large volumes of historical data and determine weight factors.

At step 204, the analytic server may train the artificial intelligence model by iteratively executing the artificial intelligence model based on the validation dataset to determine a weight factor associated with each of the plurality of attributes. As discussed above, the trained artificial intelligence model may comprise data points corresponding to the plurality of attributes and apply a logistic regression algorithm to determine a weight factor associated with each attribute. The analytic server may use a dynamic algorithm to combine the data points based on the weight factor associated with each data point. In the validation of the artificial intelligence model, the analytic server may train the artificial intelligence model by iteratively executing the artificial intelligence model based on the validation dataset. Within each iteration, the artificial intelligence model may revise the dynamic algorithm by identifying a new weight factor associated with each attribute so that the scores calculated based on the new weight factor are consistent with the known results of validation dataset. In other words, the analytic server may execute the trained artificial intelligence model on the validation dataset to see if the prediction result of the artificial intelligence model is consistent with the known result in the validation dataset. If not, the analytic server may revise the dynamic algorithm by identifying a new weight factor so that the predict result based on the new weight factor is consistent with the know result.

At step 206, the analytic server may compare the weight factors with weight values used in a computer model. The computer model may be embedded in an application or a spreadsheet (or any other online data form) running on an administrator computing device. The administrator may be an agent or an employee that manages new customers' data. New customers may comprise customers whose premium financing statuses are not determined/confirmed yet. The spreadsheet may comprise the attributes, the values of the attributes, original weight values, an original score, and the like associated with each customer of the new customers. The score may be a value reflecting the probability of the customer being premium-financing case. The computer model may calculate the score by using the dynamic algorithm based on the attributes and the original weight values (e.g., predetermined or default values). The field of original weight values may be visible or invisible to the administrator. The analytic server may compare the weight factors generated by the artificial intelligence model with the original weight values. If different, the analytic server may update the computer model by replacing the original weight values with the weight factors generated by the artificial intelligence model.

At step 208, the analytic server may cause execution of the computer model to determine a score for each new customer. After updating the computer model with the weight factors generated by the artificial intelligence model, the analytic server may apply the weight factors to the new customer dataset. The analytic server may execute the computer model to calculate a new score for each new customer based on the weight factors generated by the artificial intelligence model. The computer model may automatically update the graphical user interface (GUI) of the spreadsheet to display the new score. The new score may provide useful information for the administrator/agent to identify all premium-financing cases. For example, the administrator may investigate those with high scores (e.g., scores satisfying a threshold), and determine the status of the premium financing for those cases. The computer model may display the list of new customers based on the ranking of their scores. For example, computer model may display users with higher scores first. The ranking of the new customers may be in descending order of the scores.

In some embodiments, the computer model may execute on the administrator-computing device, as discussed above. In some other embodiments, the computer model may execute on the analytic server. For example, the analytic server may determine the score for each new customer based on the weight factors generated by the artificial intelligence model, and update the GUI on the administrator-computing device to display the scores based on the ranking of the scores.

At step 210, the analytic server may transmit a notification to the administrator-computing device prompting the administrator to confirm the scores. As discussed above, the scores may provide useful information on the status of the premium financing. The analytic server may require the administrator to investigate the customer records with high scores and confirm the status. In operation, the analytic server may transmit a notification comprising the list of customers whose scores satisfying a threshold to the administrator-computing device. For example, the notification may be an electronic message (e.g., an email), a dialogue box, and the like prompting the administrator to confirm the scores and input the premium financing status for each customer in the list of customers.

At step 212, the analytic server may receive responses regarding the scores. As discussed above, the administrator may investigate the cases with high scores and further determine the status of the premium financing for those cases. For example, the spreadsheet comprising the computer model may display a graphical user interface with an interactive element that allows the administrator to input the premium financing status for each new customer. For example, the administrator may investigate the cases with high scores and determine the premium financing status for those cases. Once the administrator makes the decision, the administrator may interact with the interactive element (e.g., button, dropdown menu, and the like) to input the status as responses to the scores. For example, the input may be a Boolean value of "0/1" or "false/true." The analytic server may receive the responses on the premium financing status by extracting the inputs from the spreadsheet.

In some embodiments, the analytic server may monitor customers with high scores and determine their premium financing status. For example, the analytic server may keep tracking of the customer application status from the very beginning (e.g., from application of a policy/product) and check the payment methods used by the customers.

At step 214, the analytic server may retrain the artificial intelligence model based on negative responses. As discussed above, the administrator may investigate the cased with high scores (e.g., satisfying a threshold) and determine the premium financing status. The administrator may determine that a case is not premium financing even if the case has a high score that satisfies the threshold. In other words, the analytic server may receive negative responses on some of the new customers whose scores satisfy a threshold. In such cases, the analytic server may determine that the artificial intelligence model does not accurately reflect the relationship between the attributes and the premium financing status. As a result, the analytic server may retrieve the new customers' data that have negative responses. The analytic server may update the historical user data in the database to include the new customers' data and retrain the artificial intelligence model based on such new customers' data.

In some embodiments, the analytic server may retrain the artificial intelligence model and revise the dynamic algorithm by identifying a new weight factor associated with each attribute so that the scores calculated based on the new weight factors are consistent with the responses received from the administrator-computing device. In other words, the analytic server may retrain the artificial intelligence model based on the new customers' data having negative responses to identify new weight factors. The new weight factors from the retrained artificial intelligence model may reflect the impact of attributes more accurately, so that the prediction result of the retrained artificial intelligence model is consistent with the responses from the administrator.

After retraining of the artificial intelligence model, the analytic server may return to step 204 to execute the retrained artificial intelligence model to determine new weight factors. Furthermore, the analytic server may automatically update/adjust the computer model in accordance with the newly retrained weight factors. The analytic server may cause execution of the updated computer model based on the revised dynamic algorithm. The analytic server may automatically calculate a new score for each new customer based on the new weight factors. In addition, the analytic server may automatically update and render the GUI of the spreadsheet by displaying the new score for each new customer. The analytic server may display the list of customers based on the ranking of their new scores.

The analytic server may perform the updating of the computer model and updating/rendering of certain fields in the spreadsheet automatically without requiring manual actions from the administrator. As a result, the embodiments disclosed herein provide an accurate and efficient system and method for dynamically generating and rendering an online data form (e.g., spreadsheet) for identifying premium-financing cases.

The analytic server may execute the retraining/updating of the artificial intelligence model periodically (e.g., predetermined time). Alternatively, the analytic server may execute the retraining/updating of the artificial intelligence model upon each time receiving a 302 negative response. As a result, the analytic server may automatically cause the computer model to recalculate the scores based on the retrained artificial intelligence model. The retrained artificial intelligence model may comprise the dynamic algorithm that identifies the impact of each attribute on the premium financing status more accurately. The recalculated scores may accurately reflect the probability of the new customers' premium financing status.

Figure 3:
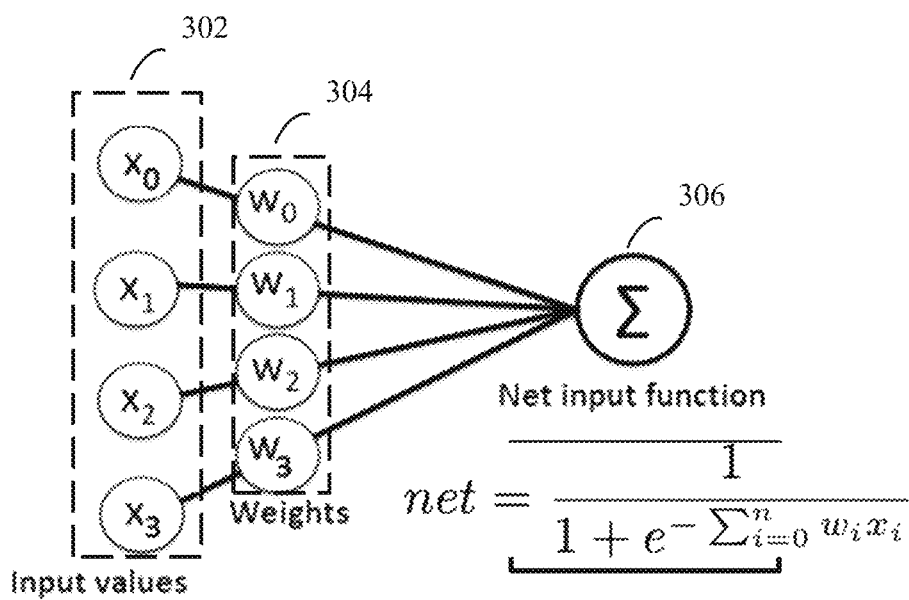
FIG. 3 illustrates an example of a dynamic algorithm, according to an embodiment.

FIG. 3 illustrates an example of the dynamic algorithm 300, according to an embodiment. The dynamic algorithm may combine the plurality of data points based on a weight factor associated with each attribute. The data points, such as $x_0$, $x_1$, $x_2$, $x_3$, may represent the values of the plurality of attributes of the customer. The analytic server may assign each data point 302 a weight factor, such as $w_0$, $w_1$, $w_2$, $w_3$, 304. The analytic server may use the plurality of attributes, (e.g., the data points 302) as the input, and calculate a score 306 by combining the data points 302 based on the weight factors 304. For example, the analytic server may first calculate the sum of the products of the value of each data point 302 multiplied by its corresponding weight factor 304, that is $$\sum_{i=0}^{n} w_i x_i.$$

In this case, n=3. The score 306 may be a result obtained by further processing the sum of the products, such as $$\text{score} = \frac{1}{1 + e^{-\sum_{i=0}^{n} w_i x_i}}.$$

Figure 4A:
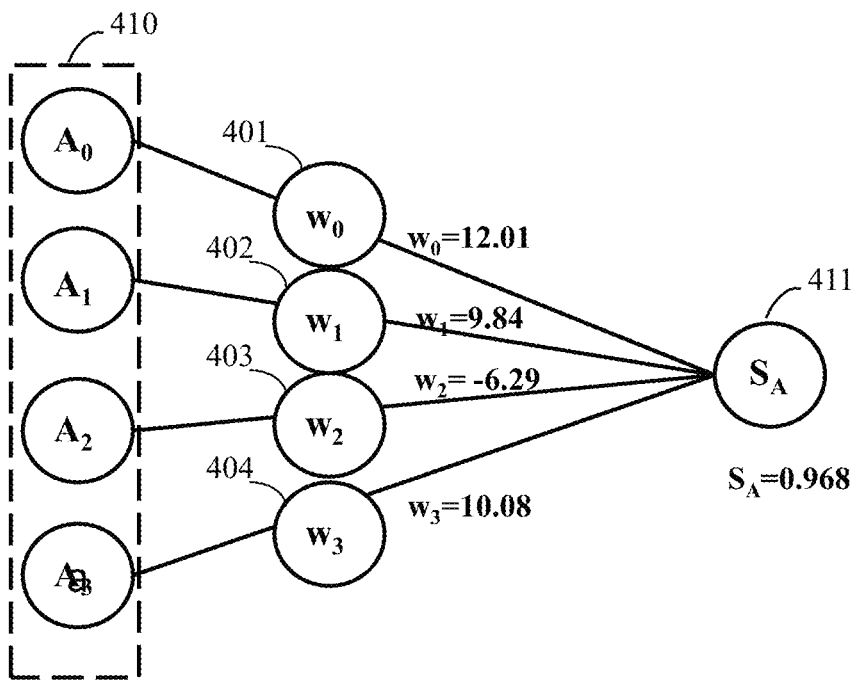
FIG. 4A illustrate examples for calculating user scores for different users based on weight factors, according to an embodiment.
Figure 4A:
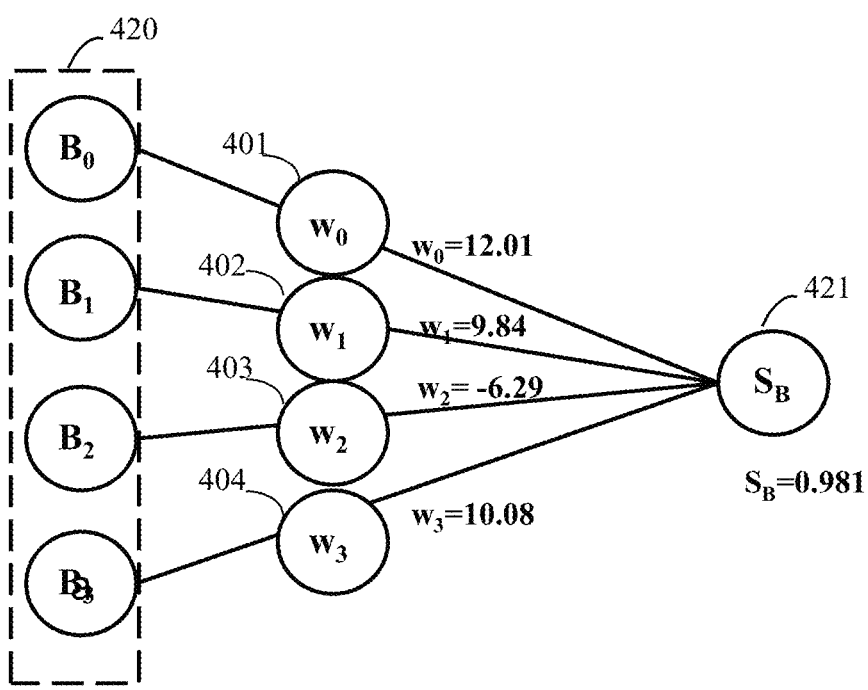

FIG. 4A illustrate examples for calculating user scores for different users 400A based on weight factors, according to an embodiment. As discussed above, the analytic server may calculate user scores using the dynamic algorithm that combining the user attribute values based on the weight factors. The user score may correspond to the customer's status (e.g., premium financing status). The plurality of attributes may include the following four attributes: a predetermined form attachment (e.g., form 7002), collateral assignment (e.g., indicating whether there is a collateral assignment associated with the policy), waiver of premium, tobacco addiction level. The artificial intelligence model may determine a weight factor for each attribute based on historical data. In this example, the weight factor $w_0$ 401 for the first attribute (predetermined form) may be 12.01 ($w_0$=12.01). The predetermined form may be a required form for policies doing premium financing, and presence of this form increases the likelihood of premium financing. Thus, the AI model may assign a relatively larger weight factor (e.g., 12.01) to this attribute. The weight factor $w_1$ 402 for the second attribute (collateral assignment) may be 9.84 ($w_1$=9.84). The presence of a collateral assignment may indicate a higher likelihood of premium financing. The weight factor $w_2$ 403 for the third factor (waiver of premium) may be −6.29 ($w_2$=−6.29). The presence of waiver of premium is indicative of people purchasing a product for long-term use with a legitimate need and less likely using premium financing. The weight factor $w_3$ 404 for the fourth attribute (tobacco addiction level) may be 10.08 ($w_3$=10.08).

The analytic serve may calculate the user scores for user A and user B. As shown in the figure, the attribute values of the four attributes for user A may be $A_0$, $A_1$, $A_2$, $A_3$ 410. The analytic server may calculate the score $S_A$ 411 for user A by combining the four attribute values 410 based on their respective weight factors 401-404 using the dynamic algorithm. Similarly, the attribute values of the four attributes for user B may be $B_0$, $B_1$, $B_2$, $B_3$ 420. The analytic server may calculate the score SB 421 for user B by combining the four attribute values 420 based on their respective weight factors 401-404 using the dynamic algorithm.

Figure 4B:
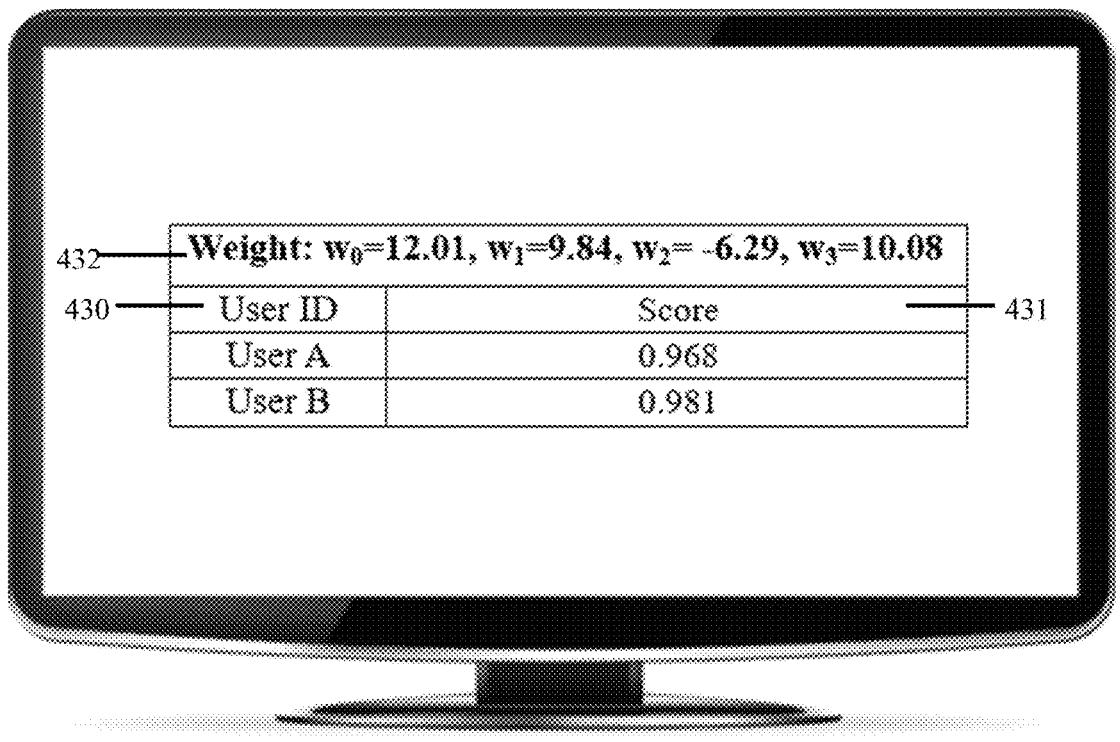
FIG. 4B illustrates an example of a graphical user interface displaying user scores, according to an embodiment.

FIG. 4B illustrates an example of a graphical user interface 400B displaying user scores, according to an embodiment. A spreadsheet may be running on an administrator-computing device that manages new customers' data. Based on the weight factors 432 for each attribute, the spreadsheet may calculate a score 431 for each customer 430 using the dynamic algorithm embedded in the spreadsheet, as shown in FIG. 4A. Furthermore, the spreadsheet GUI 400B may display the results, such as the score for each user in a corresponding cell/field in the spreadsheet. As shown in the figure, the spreadsheet GUI 400B may display the user ID 430 and the user score 431. The weight factors 432 may be output automatically generated by the AI model. The weight factor 432 may be visible or invisible to the administrator.

The administrator may investigate the cases with high scores (e.g., satisfying a threshold) and further determine the status of the premium financing for those cases. The analytic server may receive responses regarding the scores. Some of the responses may be negative responses, which means some cases are not premium financing cases even if they have scores satisfying a threshold. The analytic server may retrieve the customers' data that have negative responses and retrain the artificial intelligence model based on such new customers' data to identify new weight factors.

Figure 5A:
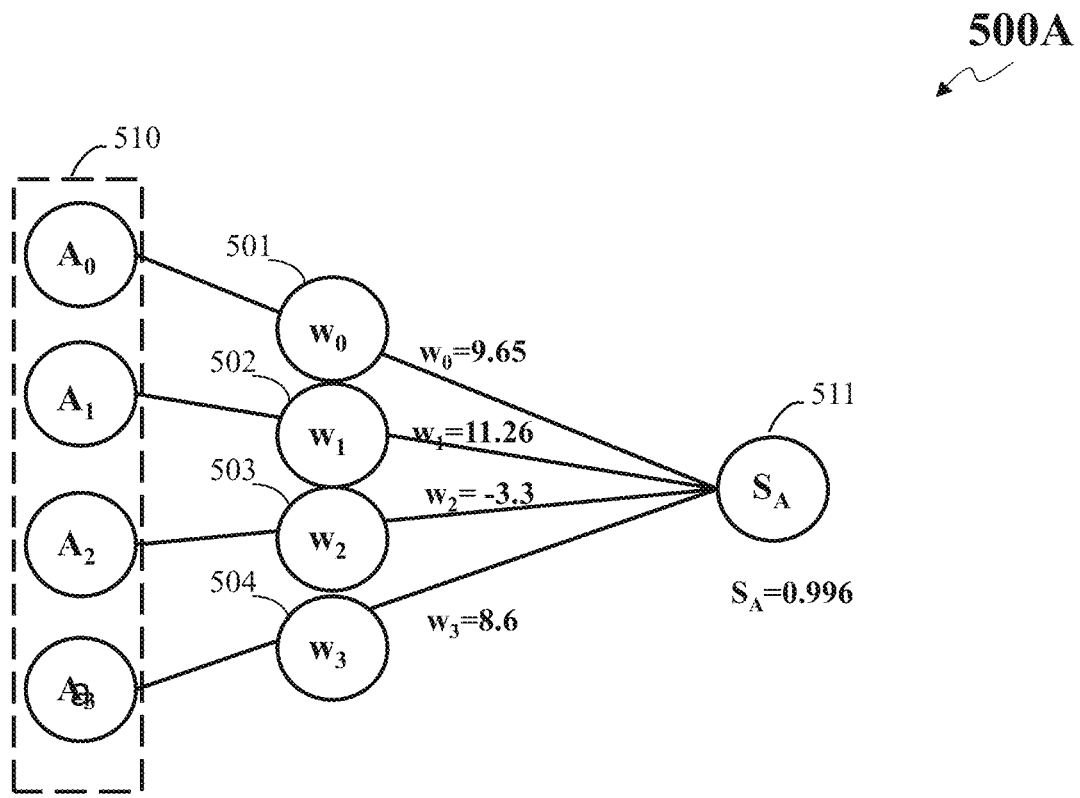
FIG. 5A illustrate examples for recalculating user scores based on updated weight factors for different users, according to an embodiment.
Figure 5A:
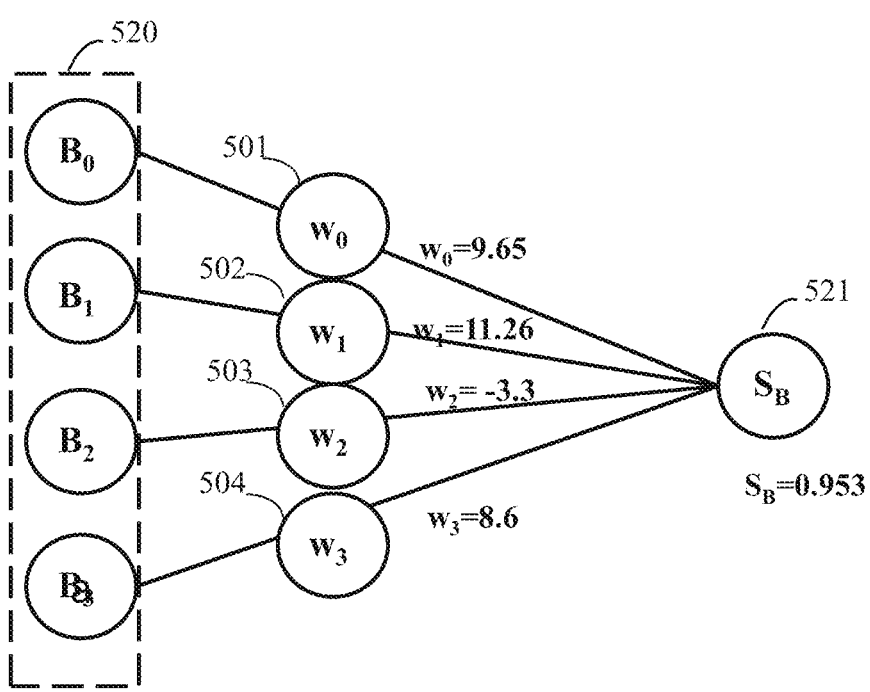

FIG. 5A illustrate examples for recalculating user scores based on updated weight factors for different users 500A, according to an embodiment. After the retaining of the AI model, the analytic server may obtain updated weight factors. For example, the analytic server may change the weight factor $w_1$ assigned to the collateral assignment attribute from 9.84 to 11.26 based on the retrained AI model. In this example, the updated weight factor $w_0$ 501 for the first attribute (predetermined form) may be 9.65 ($w_0$=9.65). The updated weight factor $w_1$ 502 for the second attribute (collateral assignment) may be 11.26 ($w_0$=11.26). The updated weight factor $w_2$ 503 for the third factor (waiver of premium) may be −3.3 ($w_2$=−3.3). The updated weight factor $w_3$ 504 for the fourth attribute (tobacco addiction level) may be 8.6 ($w_3$=8.6).

The analytic serve may recalculate the user scores for user A and user B based on the updated weight factors 501-504. As shown in the figure, the attribute values of the four attributes for user A may be the same values as $A_1$, $A_2$, $A_3$, and $A_3$ 510. The analytic server may recalculate the score $S_A$ 511 for user A by combining the four attribute values 510 based on their respective updated weight factors 501-504 using the dynamic algorithm. Similarly, the attribute values of the four attributes for user B may be the same values as $B_0$, $B_1$, $B_2$, and $B_3$ 520. The analytic server may recalculate the score SB 521 for user B by combining the four attribute values 520 based on their respective updated weight factors 501-504 using the dynamic algorithm.

Figure 5B:
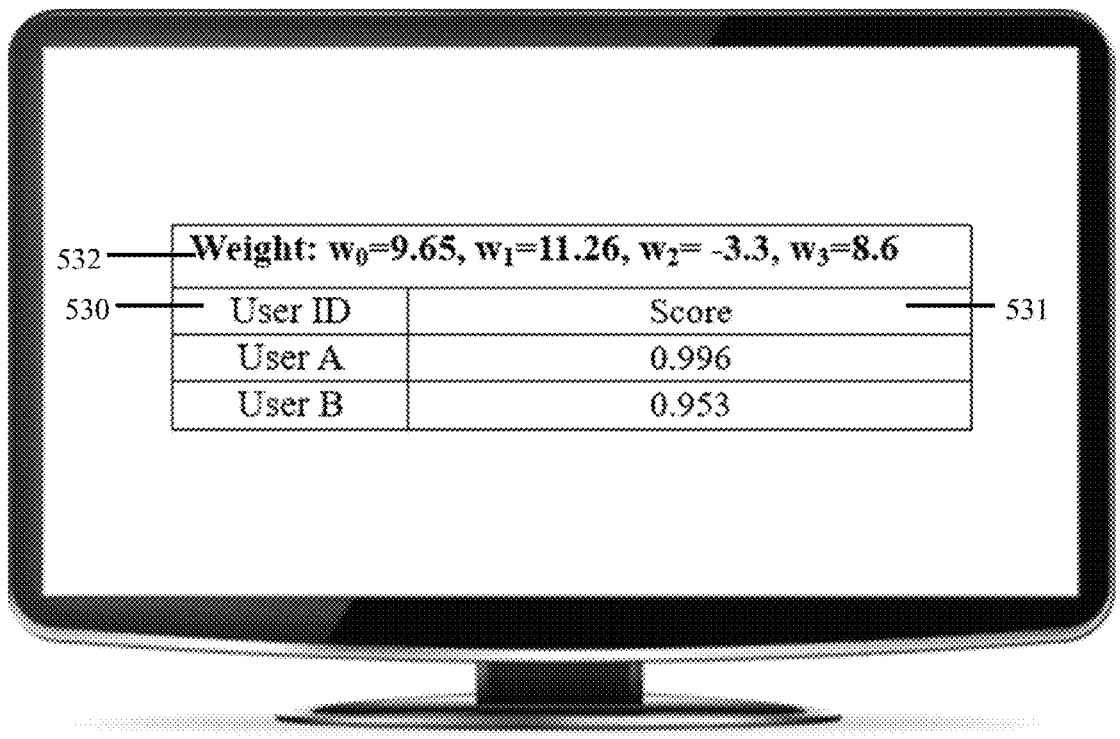
FIG. 5B illustrates an example of an updated graphical user interface displaying updated user scores, according to an embodiment.

FIG. 5B illustrates an example of an updated graphical user interface 500B displaying updated user scores, according to an embodiment. The spreadsheet may automatically calculate a new score for each customer based on the updated weight factors using the dynamic algorithm as shown in FIG. 5A. The analytic server may render the spreadsheet GUI to display the new scores. As shown in the figure, the spreadsheet GUI 500B may display the user ID 530 and the user score 531. The weight factors 532 may be output automatically generated by the retrained AI model. The weight factor 532 may be visible or invisible to the administrator. The analytic sever may perform the updating of the weight factors and the updating/rendering of the spreadsheet GUI automatically without requiring manual actions from the administrator. As a result, the embodiments disclosed herein provide an accurate and efficient system and method for dynamically generating and rendering an online form (e.g., spreadsheet) for identifying premium-financing cases.

Figure 6:
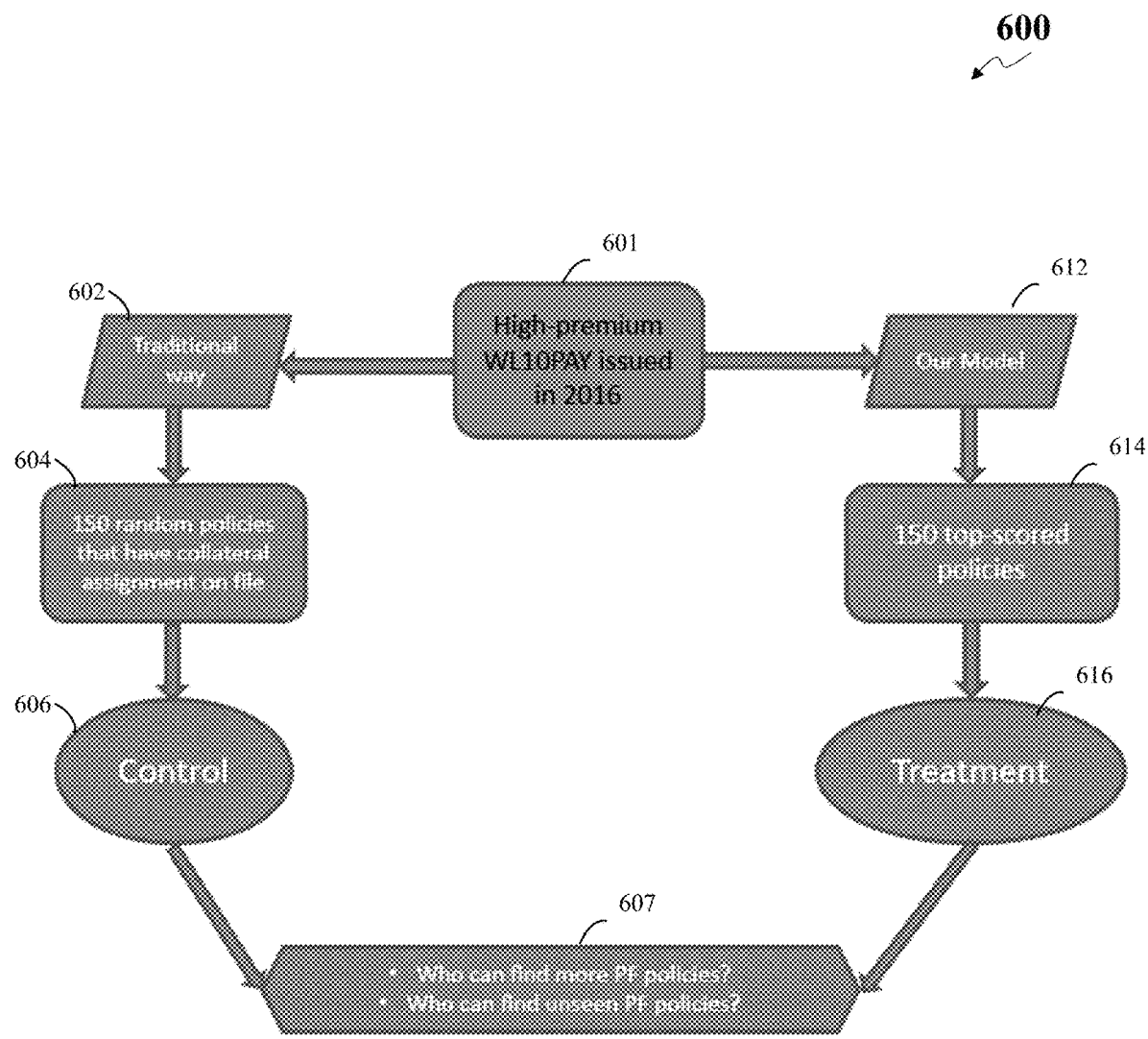
FIG. 6 illustrates a comparison between the traditional method and the method described herein, according to an embodiment.

FIG. 6 illustrates a comparison 600 between the traditional method and the method described herein, according to an embodiment. The traditional method 602 and the model described herein 612 may use the same dataset 601, which is user data with high premium issued in 2016, to identify premium financing users. The traditional method 602 may select 150 random policies that have collateral assignment on file 604 as a control group 606. The control group may include the potential premium financing users. The administrator may investigate the users within the control group 606 and identify the premium financing cases.

The model described herein 612 may calculate a score for each user as discussed above, and select 150 users with the highest scores (150 top-scored policies) 614 as a treatment group 616. The administrator may further investigate the users within the treatment group 616 to identify the premium financing cases. One way to compare the performance of the two methods may be to compare which method can find more premium financing policies, which method can find unseen premium financing policies 607.

Figure 7:
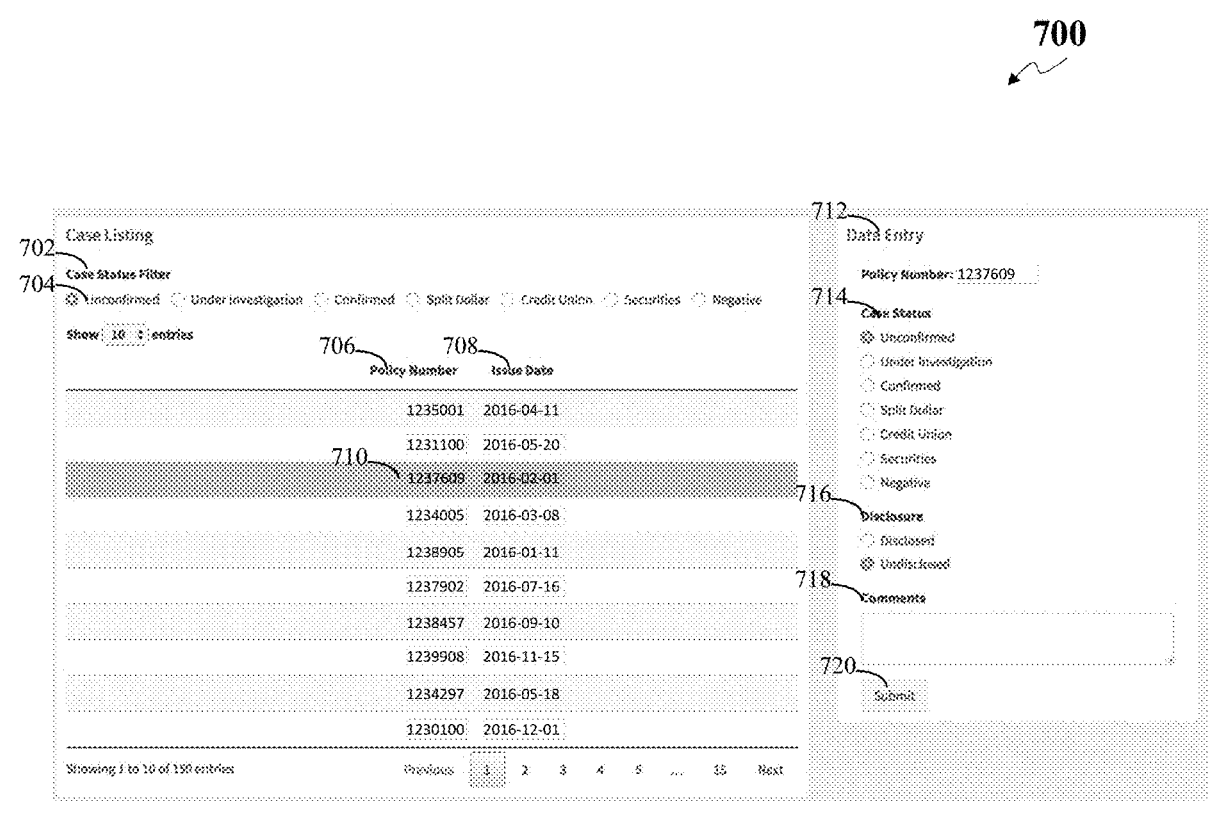

FIG. 7 illustrates a graphical user interface 700 for managing potential premium financing users in the traditional method, according to an embodiment. The traditional method may display a dashboard including the control group comprising 150 users having collateral assignment. The GUI 700 may include a case status filter 702. After the administrator selecting the "unconfirmed" status 704, the GUI 700 may display list of users whose statuses are not confirmed. For example, the GUI 700 may display the policy number 704 with issue date 708 of such a user. When the administrator selects one of the user policy 710, the GUI may further display a data entry 712 for detailed information of the selected user policy, including the case status 714, the disclosure status 716, and comments 718. The administrator may investigate the user data, determine the user premium financing status, and input the user status and/or make comments by interacting with the interactive components 714, 716, 718. The administrator may submit the input by clicking on the "submit" button 720. The administrator may investigate the 150 users within the control group in the traditional method and confirm their premium financing statuses.

Figure 8:
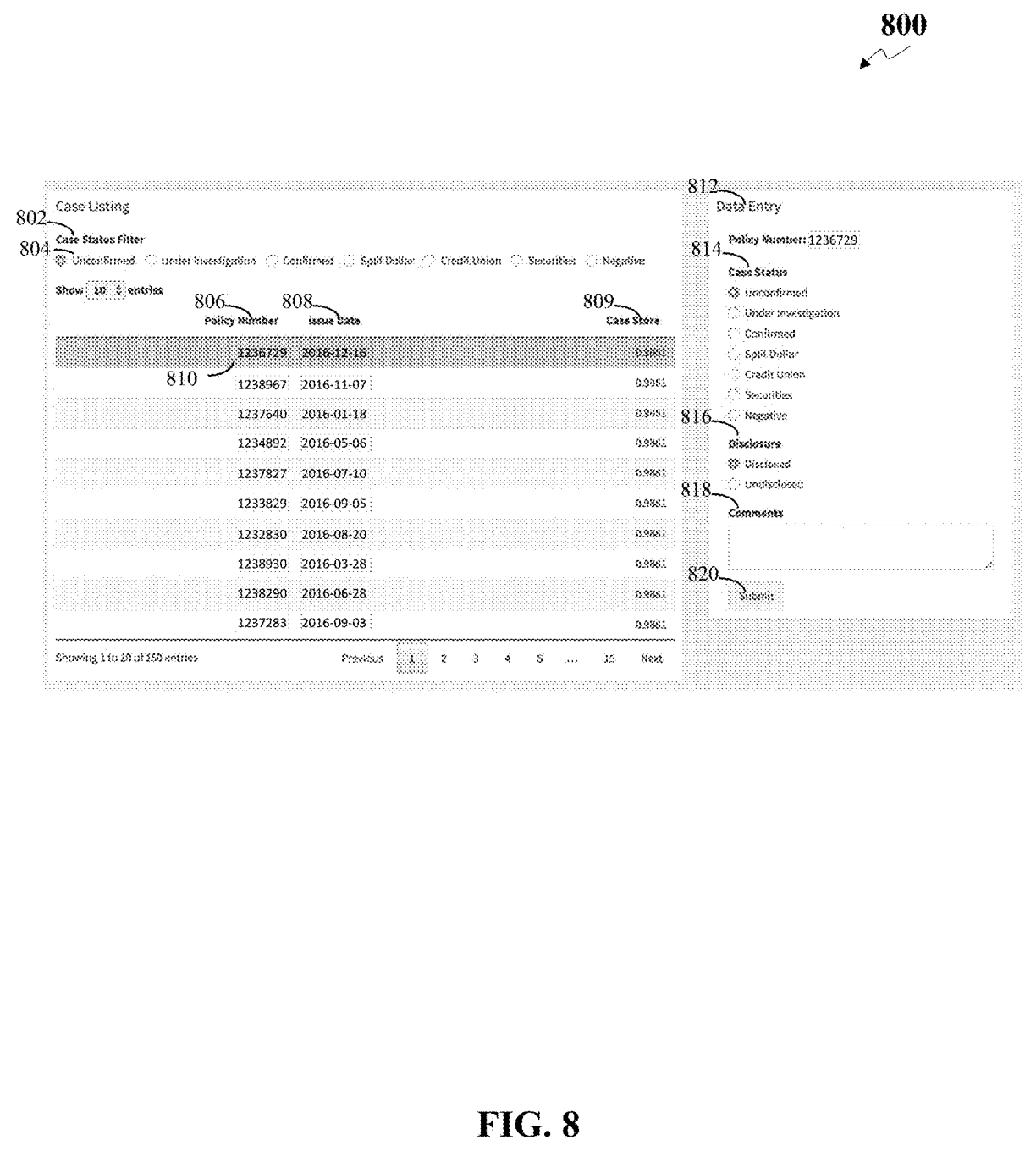

FIG. 8 illustrates a graphical user interface 800 for managing potential premium financing users in the method described herein, according to an embodiment. The method described herein may display a dashboard including the treatment group comprising 150 users having the highest scores. The GUI 800 may include a case status filter 802. After the administrator selecting the "unconfirmed" status 804, the GUI 800 may display list of users whose statuses are not confirmed. For example, the GUI 800 may display the policy number 804 with issue date 808 of such a user. Furthermore, the GUI 800 may display the scores 809 of the users. The list of users/policies may be ranked based on the scores 809 in descending order. When the administrator selects one of the user policy 810, the GUI may further display a data entry 812 for detailed information of the selected user policy, including the case status 814, the disclosure status 816, and comments 818. The administrator may investigate the user data, determine the user premium financing status, and input the user status and/or make comments by interacting with the interactive components 814, 816, 818. The administrator may submit the input by clicking on the "submit" button 820.

The GUI 800 may provide an easy-to-use dashboard for reviewing, tracking, and recording premium financing and other risky cases. The GUI 800 may automate the policy-for-review generating process. The administrators may be able to track not only premium financing but also other risky cases (e.g., credit union, split dollars, and the like). The GUI 800 may provide agency-level summary of premium financing issues.

Figure 9:
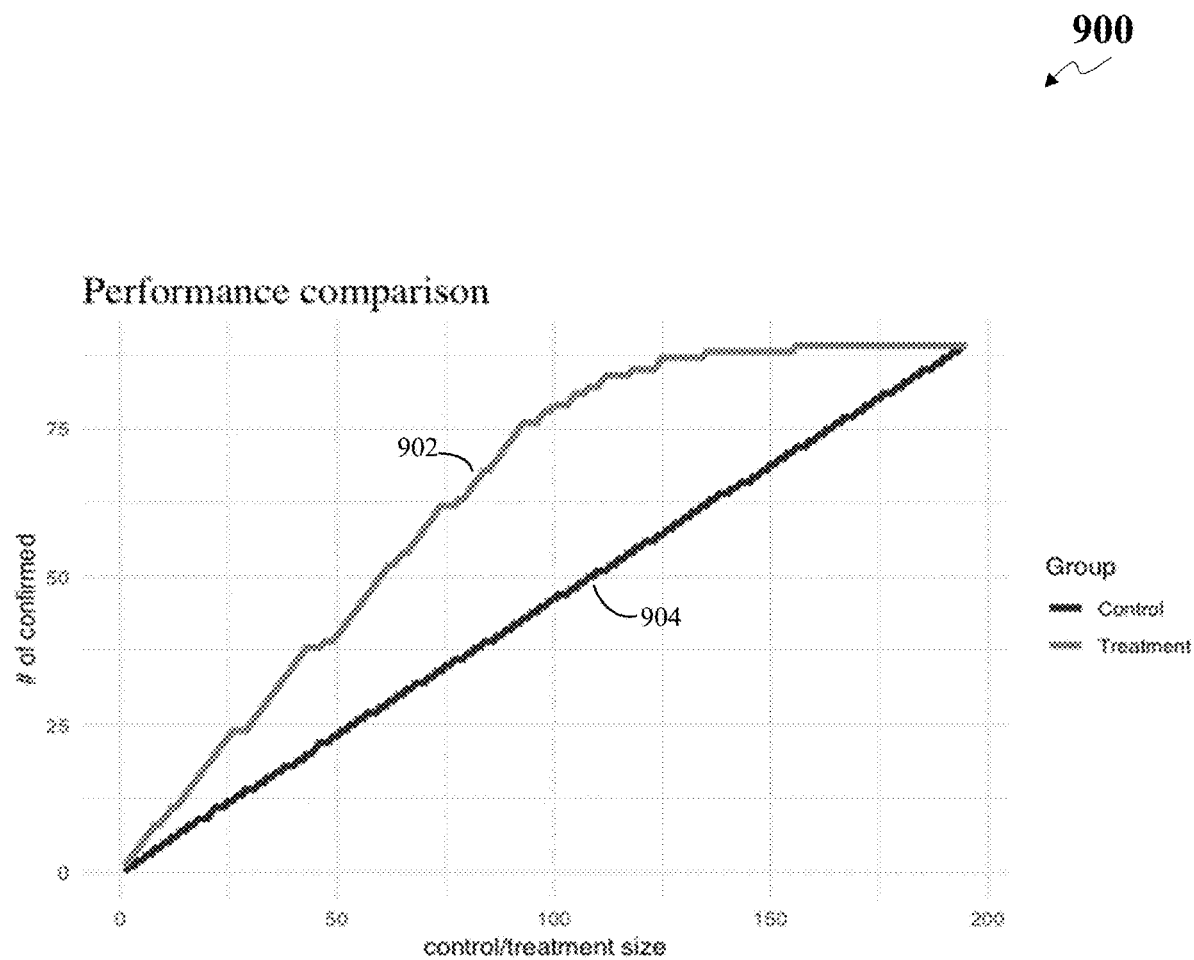
FIG. 9 illustrates the performance comparison between the traditional method and the method described herein, according to an embodiment.

FIG. 9 illustrates the performance comparison 900 between the traditional method and the method described herein, according to an embodiment. The traditional method selects users having collateral assignment as the control group and confirm their premium financing statuses. The method described herein selects users with highest scores as treatment group and confirm their premium financing statuses. As shown in the figure, the method described herein (treatment group) 902 have more confirmed premium financing users than the traditional method (control group) 904. Thus, the treatment group 902 outperforms the control group 904 in finding more premium financing cases. The treatment group is able to find more premium financing cases that are out of the control group's reach.

Non-limiting Example

In a non-limiting example, an agent may utilize a computing device to calculate a score for a new customer. The agent uses a data intake software (e.g., spreadsheet) installed on the computing device to input the customer's data (e.g., demographic and/or financial). The spreadsheet may also include one or more algorithms that use predetermined variables and weight factors along with the data inputted to generate the score. The agent may execute the spreadsheet and review the score. Because the agent may lack proper training in the field of computer science, the agent may not be able to appropriately revise the algorithm or its variables and weight factors. Even if the agent is skilled in the field of computer science, the agent must spend a considerable amount of time revising and modifying the algorithms embedded within the spreadsheet, which is a time-consuming and tedious process. Moreover, revising the spreadsheet may be error-prone, which is highly undesirable.

The methods and systems described herein allow a central server to use artificial intelligence and machine learning methodologies to dynamically revise the algorithm embedded within the spreadsheet. For example, a central server (e.g., analytics server) generates an artificial intelligence model having a set of data points that represent different attribute of a customer (e.g., demographic and financial attributes). The analytics server may train the artificial intelligence model by arranging the data points in accordance with ground truth datasets (e.g., validation data). The ground truth dataset may represent known results of previous customers and/or data received from a third-party data source. For instance, the ground truth dataset may include attributes of previous customers and their corresponding scores.

During the training process, the analytics server trains the artificial intelligence model, such that the artificial intelligence model identifies one or more weight factors used by the algorithm embedded within the spreadsheet. The artificial intelligence model may be trained to use the ground truth dataset to calculate a weight score to be used within the algorithm embedded onto the spreadsheet.

When the analytics server receives an indication that the agent has inputted data corresponding to a new user, the analytics server may automatically and remotely revise the algorithm embedded within the spreadsheet executing on the agent's computing device. As a result, the analytics server causes the spreadsheet to generate a score using weight factors calculated by the artificial intelligence model (and not the weight scores used before). In this way, the agent (who may lack programming skills) will continue using the spreadsheet without having to revise the embedded algorithm or the corresponding weight factors. The analytics server may periodically revise the weight factors and/or other variables within the algorithm. Therefore, the analytics server ensures that the spreadsheet is utilizing the latest and most accurate weight factors.

The analytics server may then monitor the agent's interactions with the spreadsheet. The analytics server may use the agent's input to revise and retrain the artificial intelligence model. For instance, the analytics server may cause the spreadsheet to display a prompt inquiring whether the agent agrees with the score that is calculated using the new weight factors. If the agent agrees with the score, the analytics server may use that confirmation and may update the agent's spreadsheet accordingly. If the agent disagrees with the score, the analytics server may retrain the artificial intelligence model and calculate a revised weight factor. The analytics server may continuously and periodically revise the artificial intelligence model until satisfactory results are achieved. In some embodiments, the analytics server may use inputs received from other agents to calculate the weight factors.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
   generating, by a server, an artificial intelligence model comprising a set of data points, each data point representing an attribute within a plurality of attributes of a historical dataset, the server using a dynamic algorithm having a first weight factor to generate a score based on the plurality of attributes, wherein the server applies a logistic regression algorithm to determine the first weight factor;
   training, by the server, the artificial intelligence model by iteratively executing the artificial intelligence model based on a validation dataset comprising known attributes and their corresponding scores, wherein with each iteration, the artificial intelligence model revises the dynamic algorithm, and wherein the server identifies a second weight factor using the trained artificial intelligence model;
   causing, by the server, execution of a computer model installed on a computing device based on a new user dataset where the computer model:
      determines the score for the new user dataset using the dynamic algorithm and the second weight factor, and
      displays the score for the new user dataset on a graphical user interface of the computing device;
   transmitting, by the server, a notification to the computing device prompting a confirmation of the score;
   in response to receiving a positive response from the computing device, automatically updating, by the server, the computer model in accordance with the second weight factor; and
   in response to receiving a negative response from the computing device, identifying, by the server, a third weight factor by retraining the artificial intelligence model, whereby the server displays a new score calculated based on the third weight factor.

2. The method of claim 1, wherein the historical dataset is a training dataset.

3. The method of claim 1, wherein the computer model is embedded in a spreadsheet.

4. The method of claim 1, wherein the dynamic algorithm is a linear function.

5. The method of claim 1, wherein the artificial intelligence model applies algorithms comprising at least one of neural networks, support vector machine, decision trees, linear and logistic regression, clustering, association rules, and scorecards to determine weight factors.

6. The method of claim 1, further comprising:
   automatically determining, by the server, a new score for the new user dataset based on the third weight factor.

7. The method of claim 1, further comprising:
automatically updating, by the server, a graphical user interface on the computing device by displaying a new score calculated based on the third weight factor.

8. The method of claim 1, further comprising:
displaying, by the server, a set of indicators corresponding to a set of new users, wherein the set of indicators are tanked in accordance with their respective score.

9. The method of claim 1, wherein the score corresponds to a probability of a customer being in a premium financing status.

10. The method of claim 1, further comprising:
updating, by the server, the artificial intelligence model periodically.

11. A system comprising:
a server comprising a processor and a non-transitory computer-readable medium containing instructions that when executed by the processor causes the processor to perform operations comprising:
generating, by a server, an artificial intelligence model comprising a set of data points, each data point representing an attribute within a plurality of attributes of a historical dataset, the server using a dynamic algorithm having a first weight factor to generate a score based on the plurality of attributes, wherein the server applies a logistic regression algorithm to determine the first weight factor;
training, by the server, the artificial intelligence model by iteratively executing the artificial intelligence model based on a validation dataset comprising known attributes and their corresponding scores, wherein with each iteration, the artificial intelligence model revises the dynamic algorithm, and wherein the server identifies a second weight factor using the trained artificial intelligence model;
causing, by the server, execution of a computer model installed on a computing device based on a new user dataset where the computer model:
determines the score for the new user dataset using the dynamic algorithm and the second weight factor, and
displays the score for the new user dataset on a graphical user interface of the computing device;
transmitting, by the server, a notification to the computing device prompting a confirmation of the score;
in response to receiving a positive response from the computing device, automatically updating, by the server, the computer model in accordance with the second weight factor; and
in response to receiving a negative response from the computing device, identifying, by the server, a third weight factor by retraining the artificial intelligence model, whereby the server displays a new score calculated based on the third weight factor.

12. The system of claim 11, wherein the historical dataset is a training dataset.

13. The system of claim 11, wherein the computer model is embedded in a spreadsheet.

14. The system of claim 11, wherein the dynamic algorithm is a linear function.

15. The system of claim 11, wherein the artificial intelligence model applies algorithms comprising at least one of neural networks, support vector machine, decision trees, linear and logistic regression, clustering, association rules, and scorecards to determine weight factors.

16. The system of claim 11, wherein the instructions further cause the processor to:
automatically determine a new score for the new user dataset based on the third weight factor.

17. The system of claim 11, wherein the instructions further cause the processor to:
automatically update a graphical user interface on the computing device by displaying a new score calculated based on the third weight factor.

18. The system of claim 11, wherein the instructions further cause the processor to:
display a set of indicators corresponding to a set of new users, wherein the set of indicators are tanked in accordance with their respective score.

19. The system of claim 11, wherein the score corresponds to a probability of a customer being in a premium financing status.

20. The system of claim 11, wherein the instructions further cause the processor to:
update the artificial intelligence model periodically.

* * * * *